United States Patent
Wieser et al.

(10) Patent No.: US 9,823,117 B2
(45) Date of Patent: Nov. 21, 2017

(54) AMBIENT LIGHT DETECTION AND DATA PROCESSING

(75) Inventors: Ralf Wieser, Beimerstetten (DE); Somakanthan Somalingam, Ulm (DE); Max Lindfors, Espoo (FI); Samu Matias Kallio, Espoo (FI)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 14/399,698

(22) PCT Filed: May 8, 2012

(86) PCT No.: PCT/IB2012/052282
§ 371 (c)(1),
(2), (4) Date: Nov. 7, 2014

(87) PCT Pub. No.: WO2013/167936
PCT Pub. Date: Nov. 14, 2013

(65) Prior Publication Data
US 2015/0092186 A1  Apr. 2, 2015

(51) Int. Cl.
*G01J 1/42* (2006.01)
*G01J 1/16* (2006.01)
*G01J 1/02* (2006.01)

(52) U.S. Cl.
CPC .......... *G01J 1/4204* (2013.01); *G01J 1/0233* (2013.01); *G01J 1/0252* (2013.01); *G01J 1/0295* (2013.01); *G01J 1/16* (2013.01)

(58) Field of Classification Search
None
See application file for complete search history.

(56) References Cited

U.S. PATENT DOCUMENTS

| 6,714,293 B2 | 3/2004 | Goto et al. |
| 7,758,234 B1 | 7/2010 | Savicki, Jr. et al. |
| 2006/0153174 A1* | 7/2006 | Towns-von Stauber .. H04L 1/20 370/356 |
| 2007/0268241 A1 | 11/2007 | Nitta et al. |
| 2008/0165116 A1 | 7/2008 | Herz et al. |
| 2008/0179701 A1 | 7/2008 | Lin et al. |
| 2008/0266554 A1 | 10/2008 | Sekine et al. |
| 2009/0015166 A1 | 1/2009 | Kwon |

(Continued)

FOREIGN PATENT DOCUMENTS

| EP | 2 249 136 A2 | 11/2010 |
| WO | WO 2010/129371 A2 | 11/2010 |

OTHER PUBLICATIONS

Maxim Integrated Produecs, Inc., "Optimize the MAX44007 Ambient Light Sensor for Use in Applications with Black Glass" Dec. 23, 2010.*

(Continued)

*Primary Examiner* — Seokyun Moon
*Assistant Examiner* — Peijie Shen
(74) *Attorney, Agent, or Firm* — Alston & Bird LLP (57) ABSTRACT

A method, apparatus, and a computer program is provided. The method comprises: determining an ambient light value from ambient light data provided by at least one ambient light sensor, in dependence upon the spectral distribution of the ambient light data provided by the at least one ambient light sensor and a manufacturer of the at least one ambient light sensor.

20 Claims, 5 Drawing Sheets

(56) References Cited

U.S. PATENT DOCUMENTS

| | | | |
|---|---|---|---|
| 2009/0079846 A1* | 3/2009 | Chou | H04N 9/735 348/223.1 |
| 2010/0110096 A1 | 5/2010 | Satoh et al. | |
| 2010/0188418 A1 | 7/2010 | Sakai et al. | |
| 2010/0218765 A1* | 9/2010 | Jafari | G01F 1/68 128/204.21 |
| 2010/0268241 A1 | 10/2010 | Flom et al. | |
| 2011/0043503 A1 | 2/2011 | Hadwen | |
| 2011/0304712 A1* | 12/2011 | Koobayashi | G02B 27/2264 348/51 |
| 2012/0001841 A1* | 1/2012 | Gokingco | G01J 1/32 345/102 |
| 2013/0169606 A1* | 7/2013 | Yin | G01J 1/0242 345/207 |

OTHER PUBLICATIONS

International Search Report and Written Opinion for Application No. PCT/IB2012/052282 dated Mar. 5, 2013.
Holenarsipur, P. et al., *Optimize the MAX44007 Ambient Light Sensor for Use in Applications With Black Glass* [online] [retrieved Oct. 1, 2014]. Retrieved from the Internet: <URL: http://www.maximintegrated.com/en/app-notes/index.mvp/id/4871>. (dated Dec. 23, 2010) 5 pages.
Lite-On Semiconductor Corp. offers a series of discretes, rectifiers, analog IC's, foundry s . . . Ambient Light Sensor Module [online] [retrieved Dec. 8, 2014]. Retrieved from the Internet: <URL: http://www.liteon-semi.com/_en/01_semicomp/02_about.php?ID=12>. (undated) 1 page.
Extended European Search Report for Application No. 12876365.3 dated Oct. 28, 2015, 7 pages.

* cited by examiner

AMBIENT LIGHT DETECTION AND DATA PROCESSING

TECHNOLOGICAL FIELD

Embodiments of the present invention relate to ambient light detection and data processing. In particular, they relate to ambient light detection and data processing in portable electronic devices.

BACKGROUND

A portable electronic device may comprise an ambient light sensor that is used to detect the illuminance of ambient light. The detected illuminance may, for example, be used to set the brightness of a display of the portable electronic device. Thus, if information provided by the ambient light sensor is incorrect or is interpreted incorrectly, the brightness of the display may be incorrectly set.

BRIEF SUMMARY

According to various, but not necessarily all, embodiments of the invention there is provided a method, comprising: determining an ambient light value from ambient light data provided by at least one ambient light sensor, in dependence upon the spectral distribution of the ambient light data provided by the at least one ambient light sensor and a manufacturer of the at least one ambient light sensor.

According to various, but not necessarily all, embodiments of the invention there is provided apparatus, comprising: at least one processor; and at least one memory storing computer program instructions configured, working with the at least one processor, to cause the apparatus to perform at least the following: determining an ambient light value from ambient light data provided by at least one ambient light sensor, in dependence upon the spectral distribution of the ambient light data provided by the at least one ambient light sensor and a manufacturer of the at least one ambient light sensor.

According to various, but not necessarily all, embodiments of the invention there is provided a non-transitory computer readable medium storing computer program instructions that, when performed by at least one processor, cause at least the following to be performed: determining an ambient light value from ambient light data provided by at least one ambient light sensor, in dependence upon the spectral distribution of the ambient light data provided by the at least one ambient light sensor and a manufacturer of the at least one ambient light sensor.

According to various, but not necessarily all, embodiments of the invention there is provided a method, comprising: determining an ambient light value by processing ambient light data provided by at least one ambient light sensor.

According to various, but not necessarily all, embodiments of the invention there is provided apparatus, comprising: at least one processor; and at least one memory storing computer program instructions configured, working with the at least one processor, to cause the apparatus to perform at least the following: determining an ambient light value by processing ambient light data provided by at least one ambient light sensor.

BRIEF DESCRIPTION

For a better understanding of various examples of embodiments of the present invention reference will now be made by way of example only to the accompanying drawings in which.

DETAILED DESCRIPTION

Data provided by an ambient light sensor can be used, for example, to control the brightness of a display by controlling display luminance, tone rendering curves and/or color profile, changing control parameters of infra-red (IR) based touch and/or proximity functionalities, and/or to set the white balance of a camera. If the data from the ambient light sensor is incorrect, it may cause an incorrect setting to be made.

In some circumstances it may be desirable, for business reasons, to acquire different ambient light sensors from different manufacturers/suppliers for a particular product (for example, a particular mobile telephone model). However, different ambient light sensors may have different responses to a given light source, which could cause different instances of the same product to operate differently in the presence of the same light source.

In embodiments of the invention, an ambient light value is determined from ambient light data provided by one or more ambient light sensors, in dependence upon the spectral distribution of the ambient light data provided by the ambient light sensor(s) and at least one property of the ambient light sensor(s). This advantageously enables suitably homogenized products to be produced.

The Figures illustrate apparatus 10/20, comprising: at least one processor 12; and at least one memory 14 storing computer program instructions 18 configured, working with the at least one processor 12, to cause the apparatus 10/20 to perform at least the following: determining an ambient light value from ambient light data provided by at least one ambient light sensor 22, in dependence upon the spectral distribution of the ambient light data provided by the at least one ambient light sensor 22 and a manufacturer of the at least one ambient light sensor 22.

Figure 1:
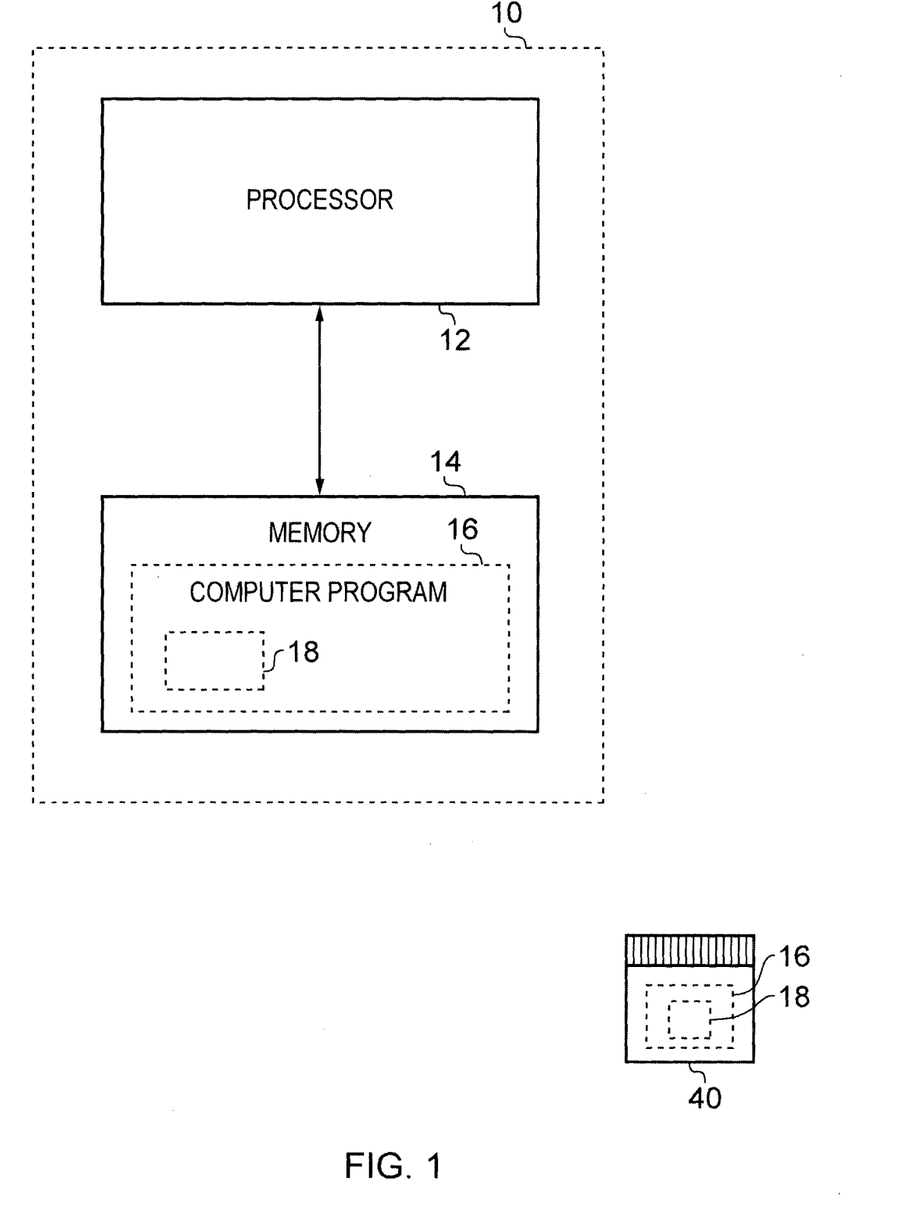
FIG. 1 illustrates an apparatus.

FIG. 1 illustrates a schematic of an apparatus 10 comprising at least one processor 12 and at least one memory 14. The apparatus 10 may, for example, be a chip or a chipset. Although a single processor 12 and a single memory 14 are illustrated in FIG. 1, in some implementations of the invention more than one processor 12 and/or more than one memory 14 is provided.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components some or all of which may be integrated/removable and/or may provide permanent/semi-permanent/dynamic/cached storage.

The memory 14 stores a computer program 16 comprising computer program instructions 18 that control the operation of the apparatus 10/20 when loaded into the processor 12. The computer program instructions 18 provide the logic and routines that enables the apparatus 10/20 to perform the methods illustrated in FIGS. 3 and 4. The processor 12, by reading the memory 14, is able to load and execute the computer program instructions 18.

The computer program instructions 18 may arrive at the apparatus 10/20 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), and/or an article of manufacture that tangibly embodies the computer program instructions 18. The delivery mechanism 40 may be a signal configured to reliably transfer the computer program instructions 18. The apparatus 10/20 may propagate or transmit the computer program instructions 18 as a computer data signal.

Figure 2:
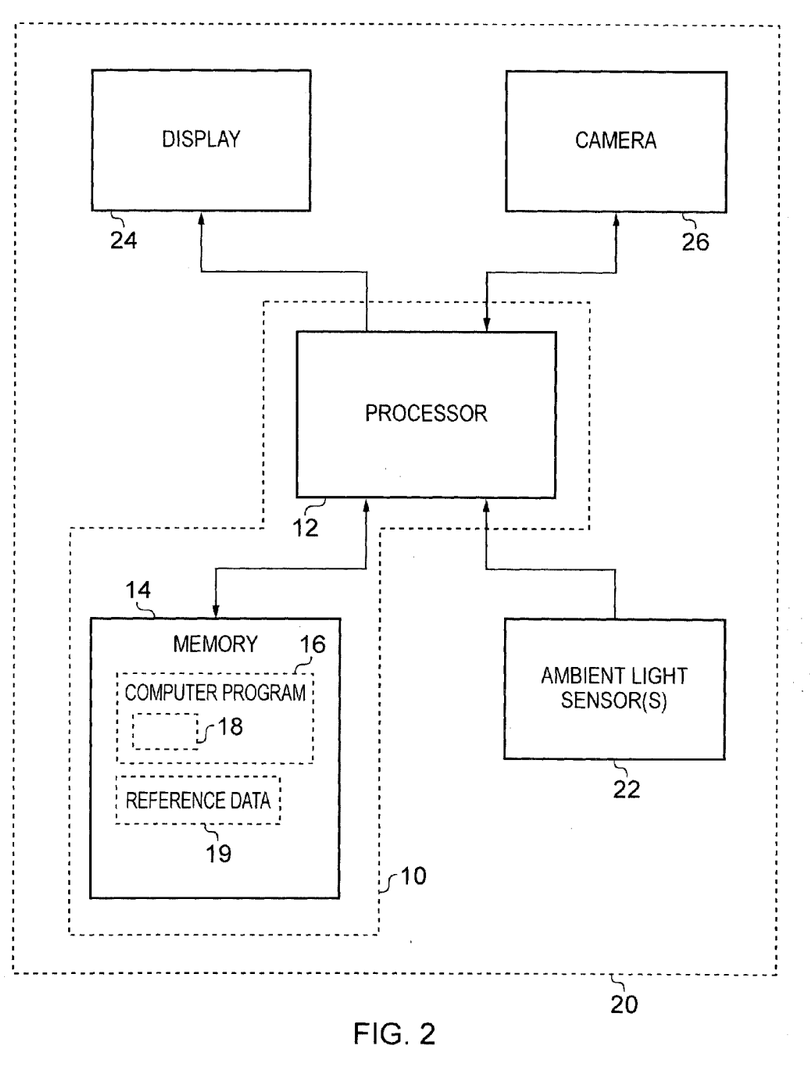
FIG. 2 illustrates a further apparatus.

FIG. 2 illustrates a further apparatus 20. The apparatus 20 may, for example, be an electronic device. In some embodiments of the invention, the apparatus 20 may be hand portable electronic device such as a camera, a mobile telephone, a tablet computer, a games console and/or a portable music player.

The apparatus 20 comprises one or more ambient light sensors 22, a display 24, a camera 26 and the apparatus 10 illustrated in FIG. 1. The elements 12, 14, 22, 24 and 26 are operationally coupled and any number or combination of intervening elements can exist (including no intervening elements).

The one or more ambient light sensors 22 are configured to sense ambient light and provide ambient light data to the processor 12. The ambient light data may, for example, indicate some or all of the following: the illuminance of sensed ambient light, the spectral distribution of sensed ambient light, the color temperature of sensed ambient light, the flicker of sensed ambient light and the angular distribution of sensed ambient light.

Figure 5:
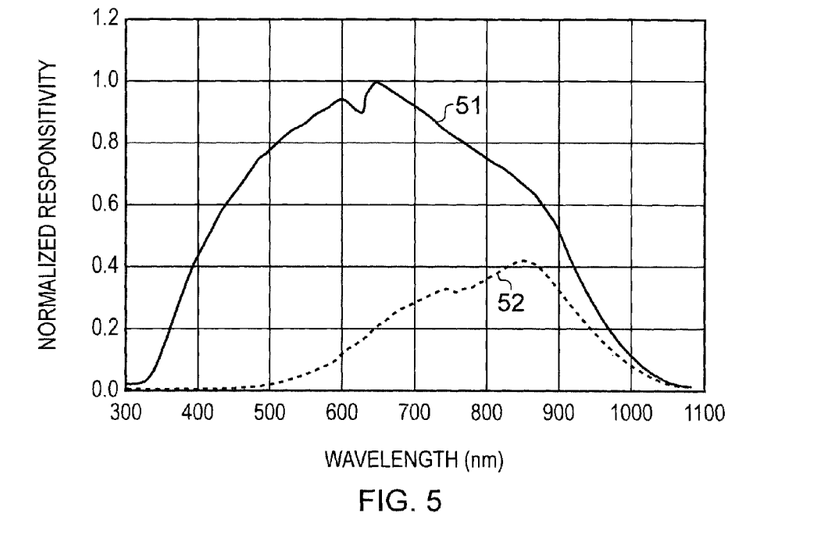
FIG. 5 is a graph illustrating the spectral responses of two different ambient light sensors.

In some embodiments, a plurality of ambient light sensors 22 is provided, each of which has a different spectral response. FIG. 5 is a graph illustrating spectral responses of different ambient light sensors. Line 51 illustrates the spectral response of a first ambient light sensor and line 52 illustrates the spectral response of a second ambient light sensor. The first ambient light sensor is configured to detect visible light; most of the light that it detects is in the visible spectrum, and its peak responsivity lies in the visible spectrum. The second ambient light sensor is configured to detect infrared light; most of the light that it detects is in the infrared spectrum and its peak responsivity lies in the infrared spectrum. An optical filter may be present in the second ambient light sensor, in order to cause it to operate in this way.

The display 24 may be configured to display still and moving images. The display 24 may be any type of display, including a liquid crystal display (LCD), an organic light emitting diode (OLED) display or a quantum dot display. In some implementations, the display may be a touch sensitive display. The processor 12 is configured to control the display 24 and, if the display is touch sensitive, the processor 12 is also configured to receive input data from the display 24.

The processor 12 is configured to control the display 24 using an ambient light value that is determined from ambient light data provided by the ambient light sensor(s) 22. For example, the processor 12 may set the brightness of the display 24 based upon the determined ambient light value.

The camera 26 is configured to capture images. The processor 12 is configured to receive input image data from the camera 26 and to apply settings to the camera 26.

The processor 12 may be configured to control the camera 26 using an ambient light value that is determined from ambient light data provided by the ambient light sensor(s) 22. For example, the processor 12 may be configured to set the white balance of the camera using the ambient light value.

A method according to embodiments of the invention will now be described with regard to FIG. 3. At block 100 of FIG. 3, the one or more ambient light sensors 22 sense ambient light. The one or more ambient light sensors 22 provide ambient light data to the processor 12.

Figure 3:
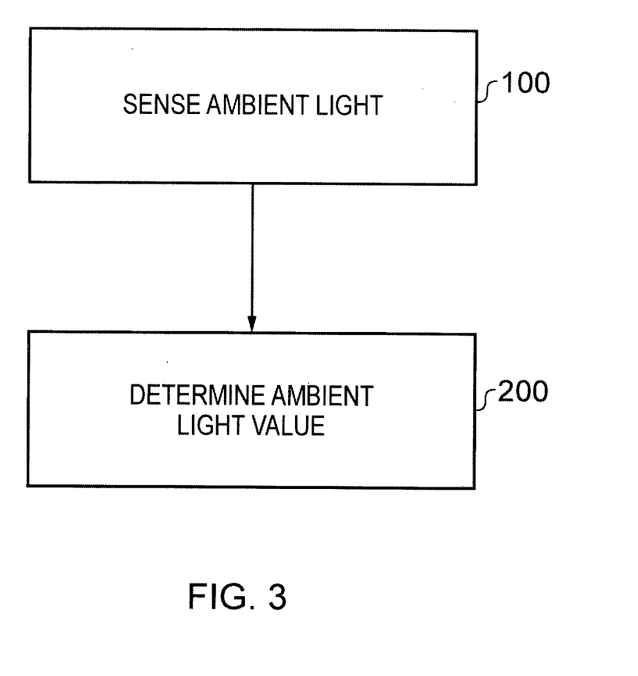
FIG. 3 illustrates a method comprising determining an ambient light value.

At block 200 of FIG. 3, an ambient light value is determined from the (raw) ambient light data provided by the one or more ambient light sensors 22, in dependence upon the spectral distribution of the ambient light data. Different ambient light values are determined by the processor 12 for different spectral distributions.

The determination that is made in block 200 may depend upon one or more further characteristics of the ambient light data that was provided by the one or more ambient light sensors 22, such as:
one or more illuminance readings;
one or more color temperatures;
ambient light flicker; and
an angular light distribution.

In some embodiments, the ambient light data includes illuminance readings from multiple ambient light sensors 22 which are processed to determine an (overall) ambient light value.

The determination that is made in block 200 of FIG. 3 may also depend upon a manufacturer of the one or more ambient light sensors 22. This is because the characteristics of an ambient light sensor made by one manufacturer may differ from one made by another manufacturer, which may cause them to respond differently to light from the same light source.

Figure 4:
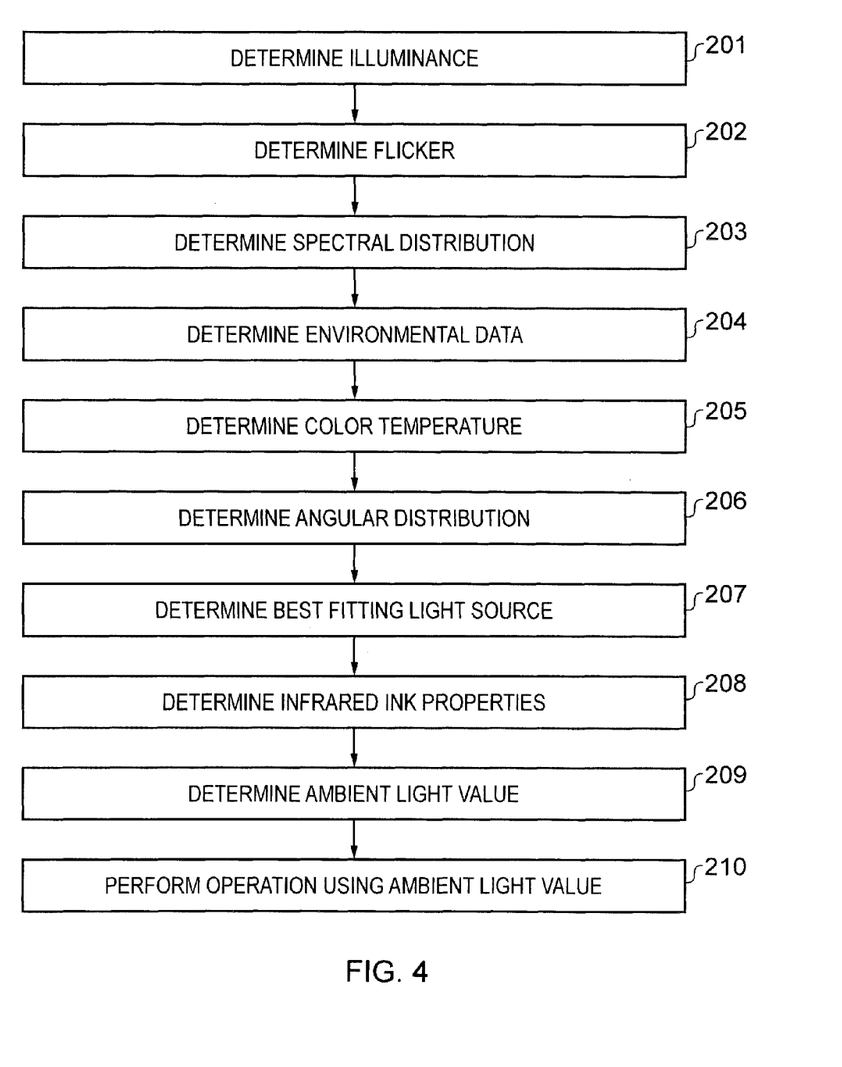
FIG. 4 illustrates a method of determining the ambient light value.

FIG. 4 illustrates a flow chart indicating how an ambient light value may be determined from the ambient light data provided by the ambient light sensor(s) 22 in more detail.

At block 201 of FIG. 4, the processor 12 determines that one or more illuminance readings are provided in the ambient light data provided by the ambient light sensor(s) 22. It may be possible to determine from the illuminance readings whether the light that has been sensed by the ambient light sensor(s) 22 originates from an artificial light source or a natural light source. For example, an illuminance reading of less than 2000 lux is typically from an artificial light source. Consequently, if an illuminance reading exceeds a threshold value in the region of 2000 lux, the processor 12 may conclude that the light that has been sensed from a natural light source (sunlight).

At block 202 of FIG. 4, the processor 12 determines whether the ambient light data provided by the ambient light sensor(s) 22 indicates that flicker noise is present in the sensed light. Flicker noise is generated by the time varying electric current (that varies, for example, at a frequency of 50/60 Hz) which is used to power an artificial light source. While the flicker noise may not be apparent to the naked eye, the processor 12 can determine from the ambient light data provided by the ambient light sensor(s) 22 if flicker noise is present. If so, the processor 12 may conclude that the ambient light data is associated with an artificial light source.

At block 203 of FIG. 4, the processor 12 analyzes the spectral distribution of the ambient light data that has been provided by the ambient light sensor(s) 22. The processor 12 may determine, from its analysis, which type of light source the sensed light relates to. For example, a light emitting diode (LED) typically emits very little infrared light. A fluorescent lamp usually emits much more visible light than infrared light. Halogen lamps emit more infrared light as a percentage of the total light emitted than both LEDs and fluorescent lamps. Natural light has an equal share of visible and infrared light.

At block 204 of FIG. 4, the processor 12 determines environmental data. The environmental data relates to the environment that the apparatus 10/20 is currently operating in, but is unrelated to sensed light and is not determined using the ambient light sensor(s) 22.

The environmental data that is determined may, for example, include: a time and/or a date (for example, the current time of day and/or the day of the year), the geographical location of the apparatus 10/20 and the ambient temperature. The processor 12 may be able to determine which type of light source ambient light data relates to from the environmental data. For example, the ambient light data will not relate to natural sunlight if the time of day is midnight. Another example might be: if it is 5 pm on a day in February and the apparatus 10/20 is determined to be in Finland, the light source may be determined to be an artificial source even if the illuminance is measured to be 3000 lux in block 201. This is because the determined environmental data is inconsistent with sunlight having an illumination of 3000 lux.

At block 205 of FIG. 4, the processor 12 determines the color temperature of the ambient light data provided by the ambient light sensor(s) 22. Different light sources have different color temperatures. For example, an incandescent light bulb may have a color temperature of 2,700 to 3,300 Kelvin, whereas a fluorescent lamp may have a color temperature of around 5,000 Kelvin. Sunlight may have a color temperature of around 5,500 to 6,000 Kelvin. The processor 12 may therefore determine the type of light source that the ambient light data relates to using the determined color temperature.

At block 206 of FIG. 4, the processor 12 determines an angular light distribution of the ambient light data. For example, the processor 12 may control the display 24 to display a user prompt which instructs the user to manipulate the apparatus 20 in a particular way. Illuminance may be measured while user manipulation of the apparatus 20 is detected by one or more motion sensors (such as one or more magnetometers, one or more accelerometers and/or one or more gyroscopes). The processor 12 may use the detected motion and the measured illuminance to determine an angular light distribution.

The processor 12 may be able to determine the type of light source that the ambient light data relates to from the angular light distribution. For instance, the processor 12 may determine that the apparatus 20 is outdoors in natural sunlight if the angular light distribution is independent of the orientation of the apparatus 20.

At block 207 of FIG. 4, the processor 12 uses the information determined in blocks 201 to 206 to determine the light source that best fits the sensed light. This may be done, for example, by comparing the information that has been determined in blocks 201 to 206 with reference data 19 stored in the memory 14.

In some embodiments of the invention, the processor 12 may merely determine whether the light source that best fits the sensed light is an artificial light source or a natural light source. In other embodiments, the processor 12 may also determine which type of artificial light source best fits the sensed light (for example, an LED lamp, a halogen lamp, a Xenon lamp, etc.).

Figure 6:
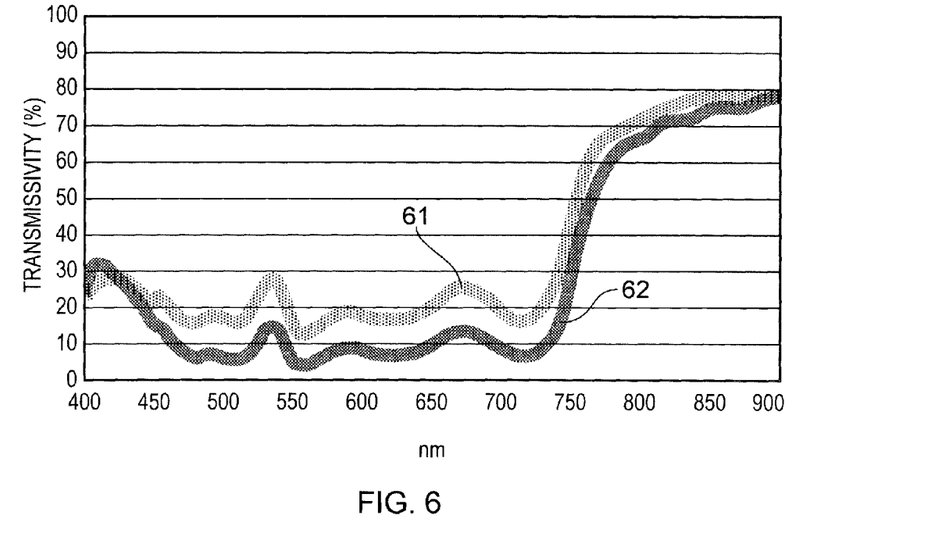
FIG. 6 is a graph illustrating transmissivity versus light wavelength for two different infrared inks.

At block 208, the processor 12 determines whether a substance (such as an infrared ink coating) has been applied to a surface intermediate the ambient light sensor(s) 22 and the light source providing the light sensed by the sensor(s) 22. The surface may be, for example, a surface of a cover window positioned above one of the ambient light sensors. It may determine this from the reference data 19 stored in the memory 14. FIG. 6 illustrates how the transmissivity of different infrared inks varies from manufacturer to manufacturer. The line 61 in FIG. 6 represents an ink made by a first manufacturer and the line 62 in FIG. 6 represents an ink made by a second manufacturer. It can be seen that the lines 61, 62 are not precisely aligned, because the inks have slightly different properties. This means that the application of different coatings (from different manufacturers) can cause the same ambient light sensor to determine that light from a particular light source has a different spectral distribution, even if the coatings purportedly have the same or similar properties.

At block 209 of FIG. 4, the processor 12 determines an ambient light value using some or all of the determinations made in blocks 201-208, and possibly also based on the manufacturer(s) of the ambient light sensor(s) 22. The processor 12 may, for example, process/adjust the (raw) ambient light data provided by the ambient light sensor(s) 22 in dependence upon some or all of the determinations made in blocks 201-208 and/or the manufacturer(s) of the ambient light sensor(s) 22.

Different formulae for calculating the ambient light value may, for example, be used for each different manufacturer. The processor 12 may determine the correct formula by analyzing the reference data 19.

At block 210 of FIG. 4, the processor 12 performs an operation using the ambient light value determined in block 209, such as setting the brightness of the display 24 and/or setting the white balance of the camera 26.

It is possible to determine the ambient light value in a variety of different ways in blocks 209 of FIG. 4, depending upon the implementation of the invention. In some implementations, the processor 12 need not carry out each and every block of the process illustrated in FIG. 4. The processor 12 may, for example, only carry out one or some of the blocks 201 to 208.

In one example of an implementation of the invention, the ambient light sensors 22 comprise a visible ambient light sensor and an infrared ambient light sensor. In this example implementation, the processor 12 may determine the ambient light value for sensors 22 made by a particular manufacturer/particular manufacturers using the following formula:

Ambient light value=raw visible ambient light measurement–$k$×raw infrared ambient light measurement where k is a constant to be determined, and each of the ambient light value, the raw visible ambient light measurement and the raw infrared ambient light measurement are illuminance values measured in lux.

In this example implementation, the processor 12 determines whether or not the light source that light is sensed from is an artificial light source or a natural light source (sunlight) using the processes described above. For example, as mentioned above, the light source may be considered to be a natural light source if the sensed illuminance exceeds a threshold such as 2000 lux. If the light source is found to be a natural light source, the constant k is 13000.

If the light source is an artificial light source, the manner in which the constant k is determined for the equation above (and therefore the determination of the ambient light value) depends upon the spectral distribution of the ambient light data provided by the one or more ambient light sensors 22 in this example implementation.

Initially, in order to determine the constant k for an artificial light source, a ratio of the raw visible light measurement to the raw infrared light measurement is calculated:

raw ambient light ratio=raw visible ambient light measurement/raw infrared ambient light measurement If this ratio is less than a particular value, which in this case is 0.35, the constant k is determined as follows:

$k$=(9700×raw ambient light ratio)+5600

If the ratio is equal to or greater than the particular value (0.35), the constant k is determined as follows:

$k$=(25000×raw ambient light ratio)−90000.

One the constant k has been determined, the ambient light value may be determined.

In summary, embodiments of the invention provide a method of dynamically adapting how an ambient light value is determined in dependence upon the spectral distribution of light that is sensed and a manufacturer of the ambient light sensor sensing the light.

Advantageously, the methods described above have been shown empirically to provide a more accurate ambient light (illuminance) value than: i) the raw value that is obtained from an ambient light sensor, and ii) adjusted values that are obtained using existing calibration methods. This is because existing calibration methods often merely involve calibrating an ambient light source using a standard A illuminant that has a spectral distribution which is different from those encountered in practice.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in FIGS. 3 and 4 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, it will be apparent to those skilled in the art that different methods of determining an ambient light value may be used from those described numerically above.

In many circumstances, the one or more ambient light sensors 22 may sense both natural light and artificial light. In such circumstances, the processor 12 may be configured to process ambient light data provided by the ambient light sensor(s) 22, in order to distinguish between the portion of the ambient light data that relates to natural light and the portion of the ambient light data that relates to artificial light. This may be done, for example, using some of the techniques described above in relation to FIG. 4. For instance, the processor 12 may attribute the portion of the ambient light data that comprises flicker noise to an artificial light source, and the portion of the ambient light data which does not comprise flicker noise to a natural light source.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   obtaining, by at least one processor, an illuminance reading from at least one ambient light sensor;
   selecting an ambient light value calculation formula, associated with an ambient light sensor manufacturer, from a plurality of different ambient light value calculation formulae, wherein the different ambient light value calculation formulae are associated with different ambient light sensor manufacturers and the selection of the ambient light value calculation formula from the plurality of different ambient light value calculation formulae depends, at least in part, on the illuminance reading from the at least one ambient light sensor; and calculating, by the at least one processor, an ambient light value from ambient light data provided by the at least one ambient light sensor using the selected ambient light value calculation formula associated with the ambient light sensor manufacturer, wherein the calculated ambient light value depends upon a spectral distribution of the ambient light data provided by the at least one ambient light sensor.

2. A method as claimed in claim 1, wherein the ambient light value is determined in dependence upon a substance intermediate the at least one ambient light sensor and a light source providing light sensed by the at least one ambient light sensor.

3. A method as claimed in claim 2, wherein the substance is an infrared ink.

4. A method as claimed in claim 1, wherein the ambient light value is determined in dependence upon ambient light flicker indicated by the ambient light data provided by the at least one ambient light sensor.

5. A method as claimed in claim 1, wherein the ambient light value is determined in dependence upon a color temperature indicated by the ambient light data provided by the at least one ambient light sensor.

6. A method as claimed in claim 1, wherein the ambient light value is determined in dependence upon a determined angular light distribution.

7. The method as claimed in claim 1, wherein the selection of the ambient light value calculation formula depends on whether the illuminance reading exceeds a threshold value.

8. The method as claimed in claim 7, further comprising:
determining that the illuminance reading does not exceed the threshold value; and the selection depends, at least in part, on the illuminance reading not exceeding the threshold value.

9. The method as claimed in claim 8, wherein the different ambient light value calculation formulae, associated with the different ambient light sensor manufacturers, include ambient light value calculation formulae for use when the illuminance reading exceeds the threshold value which do not depend on the spectral distribution of the ambient light data provided by the at least one ambient light sensor, and the ambient light value calculation formulae for use when the illuminance reading does not exceed the threshold value which depend on the spectral distribution of the ambient light data provided by the at least one ambient light sensor.

10. Apparatus, comprising:
at least one processor; and
at least one memory storing computer program instructions configured, working with the at least one processor, to cause the apparatus to perform at least the following:
obtaining an illuminance reading from at least one ambient light sensor;
selecting an ambient light value calculation formula, associated with an ambient light sensor manufacturer, from a plurality of different ambient light value calculation formulae, wherein the different ambient light value calculation formulae are associated with different ambient light sensor manufacturers and the selection of the ambient light value calculation formula from the plurality of different ambient light value calculation formulae depends, at least in part, on the illuminance reading from the at least one ambient light sensor; and
calculating an ambient light value from ambient light data provided by the at least one ambient light sensor using the selected ambient light value calculation formula associated with the ambient light sensor manufacturer, wherein the calculated ambient light value depends upon a spectral distribution of the ambient light data provided by the at least one ambient light sensor.

11. Apparatus as claimed in claim 10, wherein the ambient light value is determined in dependence upon a substance intermediate the at least one ambient light sensor and a light source providing light sensed by the at least one ambient light sensor.

12. Apparatus as claimed in claim 11, wherein the substance is an infrared ink.

13. Apparatus as claimed in claim 10, wherein the ambient light value is determined in dependence upon the illuminance reading indicated by the ambient light data provided by the at least one ambient light sensor.

14. Apparatus as claimed in claim 10, wherein the ambient light value is determined in dependence upon ambient light flicker indicated by the ambient light data provided by the at least one ambient light sensor.

15. Apparatus as claimed in claim 10, wherein the ambient light value is determined in dependence upon a color temperature indicated by the ambient light data provided by the at least one ambient light sensor.

16. Apparatus as claimed in claim 10, wherein the ambient light value is determined in dependence upon a determined angular light distribution.

17. Apparatus as claimed in claim 10, wherein the at least one ambient light sensor comprises a first ambient light sensor and a second ambient light sensor, wherein the first ambient light sensor has a different spectral response from the second ambient light sensor.

18. Apparatus as claimed in claim 10, wherein the computer program instructions are further configured, working with the at least one processor, to cause the apparatus to perform: determining at least one of a time, a date, a location and a temperature, and the ambient light value is determined in dependence upon at least one of the determined time, date, location and temperature.

19. Apparatus as claimed in claim 10, further comprising: the at least one ambient light sensor.

20. A non-transitory computer readable medium storing computer program instructions that, when performed by at least one processor, cause at least the following to be performed:
obtaining an illuminance reading from at least one ambient light sensor;
selecting an ambient light value calculation formula, associated with an ambient light sensor manufacturer, from a plurality of different ambient light value calculation formulae, wherein the different ambient light value calculation formulae are associated with different ambient light sensor manufacturers and the selection of the ambient light value calculation formula from the plurality of different ambient light value calculation formulae depends, at least in part, on the illuminance reading from the at least one ambient light sensor; and
calculating an ambient light value from ambient light data provided by the at least one ambient light sensor using the selected ambient light value calculation formula associated with the ambient light sensor manufacturer, wherein the calculated ambient light value depends upon a spectral distribution of the ambient light data provided by the at least one ambient light sensor.

* * * * *